US012596249B2

(12) United States Patent　　(10) Patent No.: US 12,596,249 B2

Takada　　(45) Date of Patent: Apr. 7, 2026

(54) OPTICAL PATH CONTROL APPARATUS, DISPLAY APPARATUS, AND METHOD OF CONTROLLING OPTICAL PATH

(71) Applicant: JVCKENWOOD Corporation, Yokohama (JP)

(72) Inventor: Hiroyuki Takada, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 869 days.

(21) Appl. No.: 17/844,089

(22) Filed: Jun. 20, 2022

(65) Prior Publication Data

US 2022/0404610 A1　　Dec. 22, 2022

(30) Foreign Application Priority Data

Jun. 22, 2021　(JP) ................................. 2021-102973
Jun. 22, 2021　(JP) ................................. 2021-103275
Jun. 22, 2021　(JP) ................................. 2021-103353

(51) Int. Cl.
　　*G02B 26/08*　　(2006.01)
　　*G02F 1/29*　　(2006.01)

(52) U.S. Cl.
　　CPC ........... *G02B 26/08* (2013.01); *G02B 26/085* (2013.01); *G02F 1/29* (2013.01)

(58) Field of Classification Search
　　None
　　See application file for complete search history.

(56) References Cited

U.S. PATENT DOCUMENTS

| 5,640,065 A | * | 6/1997 | Abe | ........................ H02N 2/004 |
| | | | | 310/317 |
| 9,664,980 B2 | | 5/2017 | Mizoguchi et al. | |
| 2005/0146540 A1 | | 7/2005 | Marshall et al. | |
| 2010/0220405 A1 | | 9/2010 | Chee et al. | |
| 2015/0277104 A1 | * | 10/2015 | Hino | ....................... G02B 26/08 |
| | | | | 359/199.3 |

(Continued)

FOREIGN PATENT DOCUMENTS

| EP | 3002631 | 4/2016 |
| JP | 2011-158589 | 8/2011 |

(Continued)

OTHER PUBLICATIONS

Extended European Search Report for European Patent Application No. 22179931.5 dated Nov. 21, 2022.

*Primary Examiner* — Dung T Nguyen

(74) *Attorney, Agent, or Firm* — Amin, Turocy & Watson, LLP

(57)　　　ABSTRACT

An optical path control apparatus includes an oscillating part including an optical member on which light is made incident; an actuator configured to oscillate the oscillating part; and a drive unit configured to apply to the actuator a drive signal with a waveform including a first period in which a current value is changed from a first current value to a second current value and including a second period that is continuous with the first period and in which the current value is held at the second current value, to cause the actuator to oscillate the oscillating part and to control an optical path. The drive unit applies the drive signal so that the length of the first period is a value corresponding to the natural frequency of the oscillating part.

6 Claims, 8 Drawing Sheets

(56)     References Cited

U.S. PATENT DOCUMENTS

| | | | |
|---|---|---|---|
| 2020/0174246 A1* | 6/2020 | Wakabayashi ......... | G02B 26/08 |
| 2020/0301118 A1 | 9/2020 | Lin et al. | |
| 2020/0371402 A1 | 11/2020 | Hirakura | |
| 2021/0096449 A1 | 4/2021 | Hirakura | |

FOREIGN PATENT DOCUMENTS

| | | |
|---|---|---|
| JP | 2016-071232 | 5/2016 |
| JP | 2018-155989 | 10/2018 |

\* cited by examiner

OPTICAL PATH CONTROL APPARATUS, DISPLAY APPARATUS, AND METHOD OF CONTROLLING OPTICAL PATH

CROSS-REFERENCE TO RELATED APPLICATIONS

This application claims priority from Japanese Application Nos. 2021-102973, 2021-103275, and 2021-103353, each filed on Jun. 22, 2021, the entire contents of which are incorporated herein by reference.

BACKGROUND

The present invention relates to an optical path control apparatus, a display apparatus, and method of controlling an optical path.

For example, as shown in Japanese Patent No. 6451187, there are known optical devices shifting an optical axis by oscillating an optical part on which light is made incident. Japanese Patent No. 6451187 states that the resolution of a projected image can be made higher than the resolution of an optical modulation apparatus by oscillating the optical part to shift the optical path of light passing through the optical part.

When shifting the optical path in this way, it is required that the optical part be oscillated at high speed and be stopped stably.

SUMMARY

An optical path control apparatus according to an embodiment includes: an oscillating part having an optical member on which light is made incident; an actuator configured to oscillate the oscillating part; and a drive unit configured to apply to the actuator a drive signal with a waveform including a first period in which a current value is changed and including a second period that is continuous with the first period and in which the current value is held, to cause the actuator to oscillate the oscillating part and to control an optical path, the drive unit applying the drive signal so that a length of the first period is a value corresponding to a natural frequency of the oscillating part.

A display apparatus according to an embodiment includes: the above-described optical path control apparatus; and an irradiation apparatus applying light to the optical member.

A method according to an embodiment is of controlling an optical path by applying a drive signal to an actuator configured to oscillate an oscillating part including an optical member on which light is made incident. The method includes: applying to the actuator the drive signal with a waveform including a first period in which a current value is changed and including a second period that is continuous with the first period and in which the current value is held, to cause the actuator to oscillate the oscillating part. A length of the first period is set to a value corresponding to a natural frequency of the oscillating part.

DETAILED DESCRIPTION

The following describes the present embodiments in detail based on the accompanying drawings. The embodiments described below do not limit the present invention.

First Embodiment

Display Apparatus

Figure 1:
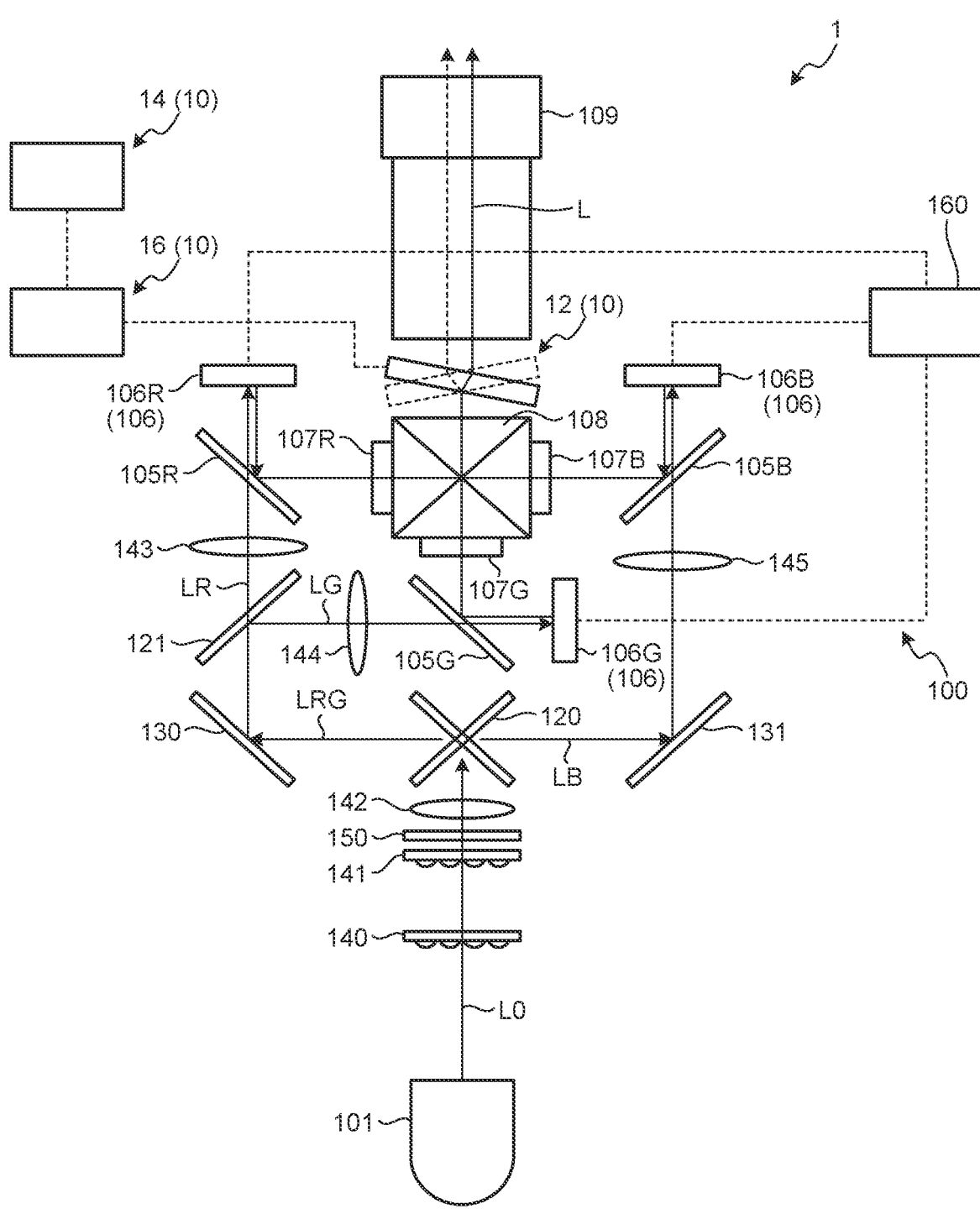
FIG. 1 is a schematic diagram of a display apparatus according to a first embodiment.

FIG. 1 is a schematic diagram of a display apparatus according to a first embodiment. As illustrated in FIG. 1, this display apparatus 1 according to the first embodiment has an optical path control apparatus 10 and an irradiation apparatus 100. The irradiation apparatus 100 is an apparatus applying light L for images, whereas the optical path control apparatus 10 is an apparatus controlling an optical path of the light L. In the present embodiment, the optical path control apparatus 10 shifts the optical axis of the light L to shift the position of an image displayed by the light L and to make the resolution of a projected image higher than the resolution of an image by the irradiation apparatus 100 (that is, the number of pixels of a display element 106 described below).

As illustrated in FIG. 1, the irradiation apparatus 100 includes a light source 101, polarizing plates 105R, 105G, and 105B, display elements 106R, 106G, and 106B, polarizing plates 107R, 107G, and 107B, a color combining prism 108, a projection lens 109, dichroic mirrors 120 and 121, reflective mirrors 130 and 131, lenses 140 to 145, a polarization conversion element 150, and an image signal processing circuit 160. When the display element 106R, the display element 106G, and the display element 106B are not distinguished from each other, they are referred to as the display element 106.

The light source 101 is a light source generating light and applying it. The light source 101 applies incident light L0. The present embodiment, which takes using one light source 101 as the light source applying the incident light L0 as an example, may have another optical apparatus for generating the incident light L0.

The incident light L0 from the light source 101 is made incident on the lens 140. The lenses 140 and 141 are, for example, fly-eye lenses. The incident light L0 is made uniform in illumination distribution by the lenses 140 and 141 and is made incident on the polarization conversion element 150. The polarization conversion element 150 is an element aligning the polarization of the incident light L0 and has, for example, a polarization beam splitter and a retardation plate. For example, the polarization conversion element 150 aligns the incident light L0 to the p-polarized light.

The incident light L0, the polarization of which has been aligned by the polarization conversion element 150, is applied to the dichroic mirror 120 through the lens 142. The lens 142 is, for example, a condenser lens.

The dichroic mirror 120 separates the incident light L0 made incident thereon into yellow light LRG and blue light LB, which contains blue band components. The yellow illumination light LRG separated by the dichroic mirror 120 reflects off the reflective mirror 130 and is made incident on the dichroic mirror 121.

The dichroic mirror 121 separates the yellow light LRG made incident thereon into red light LR, which contains red band components, and green light LG, which contains green band components.

The red light LR separated by the dichroic mirror 121 is applied to the polarizing plate 105R through the lens 143. The green light LG separated by the dichroic mirror 121 is applied to the polarizing plate 105G through the lens 144. The blue light LB separated by dichroic mirror 120 reflects off the reflective mirror 131 and is applied to the polarizing plate 105B through the lens 145.

The polarizing plates 105R, 105G, and 105B have the property of reflecting either the s-polarized light or the p-polarized light and passing the other. For example, the polarizing plates 105R, 105G, and 105B reflect the s-polarized light and pass the p-polarized light. The polarizing plates 105R, 105G, and 105B are also referred to as reflective polarizing plates.

The red light LR, which is the p-polarized light, passes through the polarizing plate 105R and is applied to the display element 106R. The green light LG, which is the p-polarized light, passes through the polarizing plate 105G and is applied to the display element 106G. The blue light LB, which is the p-polarized light, passes through the polarizing plate 105B and is applied to the display element 106B.

The display element 106R, the display element 106G, and the display element 106B are, for example, reflective liquid crystal display elements. The present embodiment describes a case in which the display element 106R, the display element 106G, and the display element 106B are reflective liquid crystal display elements as an example; not limited to the reflective type, transmissive liquid crystal display elements may also be used. They can also be applied in various ways to configurations including other display elements in place of the liquid crystal display elements.

The display element 106R is controlled by the image signal processing circuit 160. The image signal processing circuit 160 drives and controls the display element 106R based on red component image data. The display element 106R optically modulates the red light LR as the p-polarized light in accordance with the control of the image signal processing circuit 160 to generate the red light LR as the s-polarized light. The display element 106G is controlled by the image signal processing circuit 160. The image signal processing circuit 160 drives and controls the display element 106G based on green component image data. The display element 106G optically modulates the green light LG as the p-polarized light in accordance with the control of the image signal processing circuit 160 to generate the green light LG as the s-polarized light. The display element 106B is controlled by the image signal processing circuit 160. The image signal processing circuit 160 drives and controls the display element 106B based on blue component image data. The display element 106B optically modulates the blue light LB as the p-polarized light based on the blue component image data in accordance with the control of the image signal processing circuit 160 to generate the blue light LB as the s-polarized light.

The polarizing plates 107R, 107G, and 107B have the property of passing either the s-polarized light or the p-polarized light and reflecting or absorbing the other. For example, the polarizing plates 107R, 107G, and 107B pass the s-polarized light and absorb the p-polarized light, which is unnecessary.

The red light LR as the s-polarized light generated by the display element 106R is reflected by the polarizing plate 105R, passes through the polarizing plate 107R, and is applied to the color combining prism 108. The green light LG as the s-polarized light generated by the display element 106G is reflected by the polarizing plate 105G, passes through the polarizing plate 107G, and is applied to the color combining prism 108. The blue light LB as the s-polarized light generated by the display element 106B is reflected by the polarizing plate 105B, passes through the polarizing plate 107B, and is applied to the color combining prism 108.

The color combining prism 108 combines the red light LR, the green light LG, and the blue light LB made incident and applies them as the light L for image display to the projection lens 109. The light L is projected onto a screen or the like, not illustrated, through the projection lens 109.

Although the irradiation apparatus 100 is configured as described above, its configuration is not limited to the above description; any configuration may be employed.

The optical path control apparatus 10 has an optical path control mechanism 12, a control circuit (a controller) 14, and a drive circuit (a drive unit) 16. The optical path control mechanism 12 is a mechanism oscillating by being driven by the drive circuit 16. The optical path control mechanism 12 is provided between the color combining prism 108 and the projection lens 109 in a direction along the optical path of the light L. The optical path control mechanism 12 oscillates while the light L from the color combining prism 108 is made incident thereon, thereby shifting the travel direction (the optical path) of the light L and emitting it toward projection lens 109. Thus, the optical path control apparatus 10 controls the optical path of the light L so as to shift the optical path of the light L. The position in which the optical path control mechanism 12 is provided is not limited to between the color combining prism 108 and the projection lens 109 but may be any position.

Figure 2:
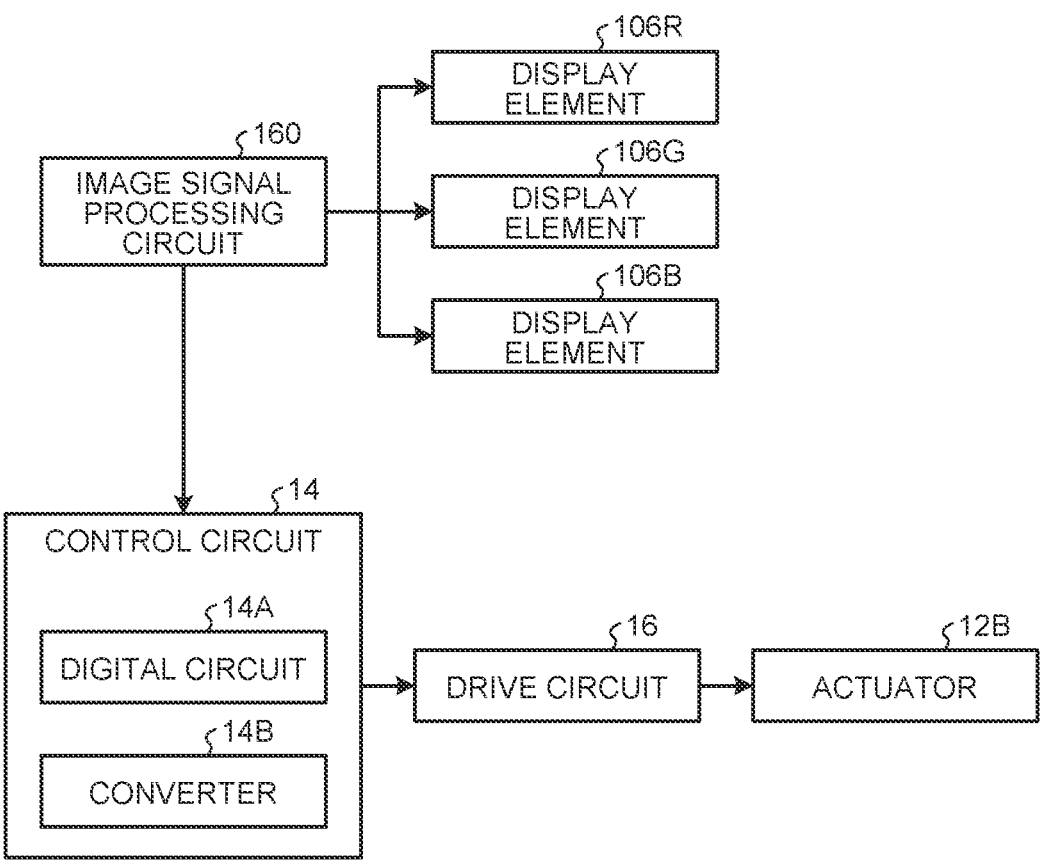
FIG. 2 is a block diagram schematically illustrating a circuit configuration of the display apparatus.

FIG. 2 is a block diagram schematically illustrating a circuit configuration of the display apparatus. As illustrated in FIG. 2, the image signal processing circuit 160 controls the display elements 106R, 106B, and 106G. An image signal including image data for controlling the display elements 106R, 106B, and 106G and a synchronization signal is input to the image signal processing circuit 160. The image signal processing circuit 160 controls the display elements 106R, 106B, and 106G based on the image data while synchronizing timing based on the synchronization signal. A control circuit 14 has a digital circuit 14A and a converter 14B. The synchronization signal from the image signal processing circuit 160 is input to the digital circuit 14A. The digital circuit 14A generates a digital drive signal to drive the optical path control mechanism 12 while synchronizing timing based on the synchronization signal. The converter 14B is a digital-to-analog (DA) converter converting a digital signal to an analog signal. The converter 14B converts the digital drive signal generated by the digital circuit 14A into an analog drive signal. The drive circuit 16 receives input of the analog drive signal from the converter 14B, amplifies the analog drive signal, and outputs it to actuators 12B of the optical path control mechanism 12 described below. The actuators 12B are driven in response to the drive signal to oscillate an oscillating part 12A described below.

Optical Path Control Mechanism

Figure 3:
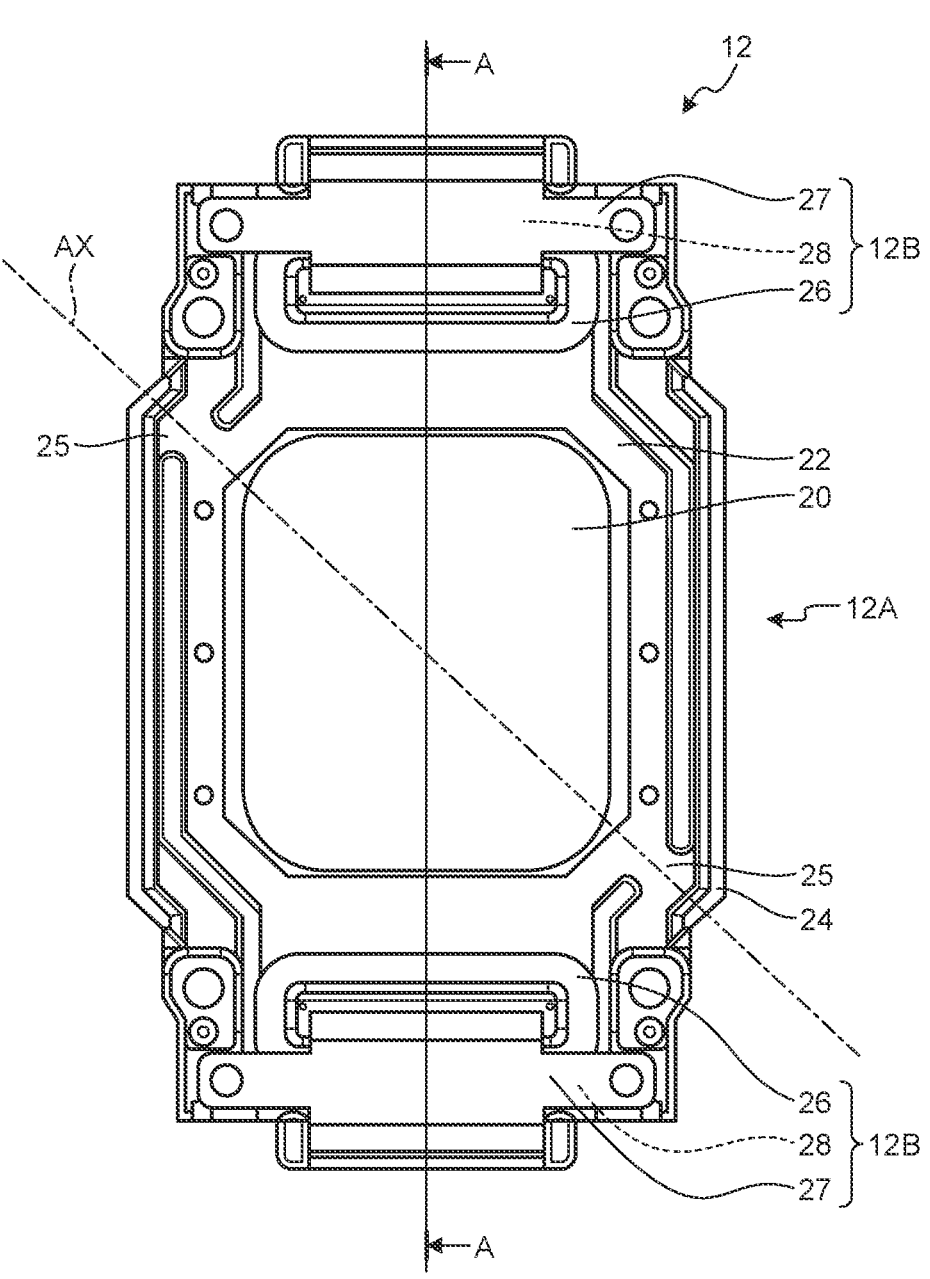
FIG. 3 is a schematic diagram of an optical path control mechanism.
Figure 4:
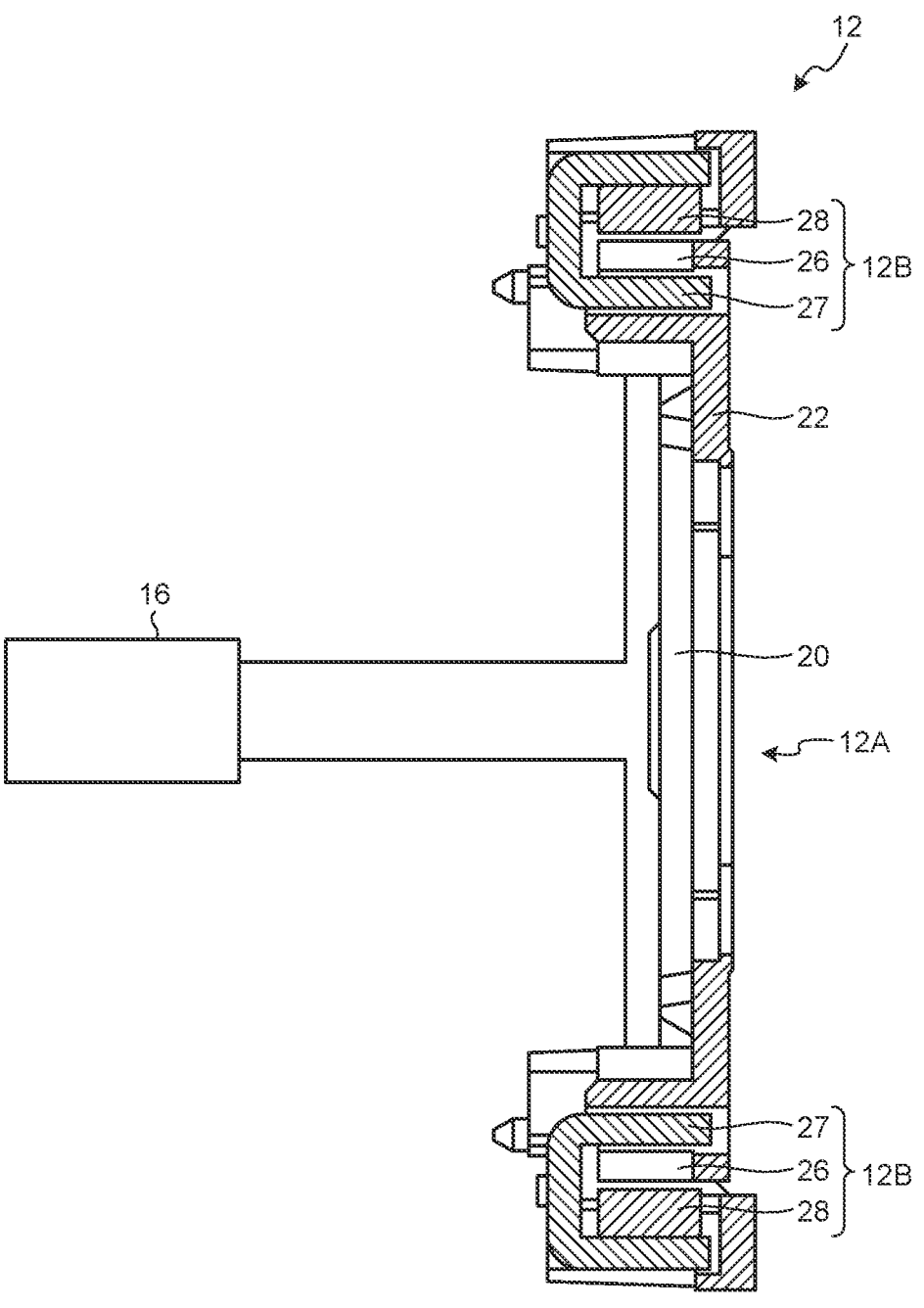
FIG. 4 is an A-A sectional view of FIG. 3.

The following describes the configuration of the optical path control mechanism 12 more specifically. FIG. 3 is a schematic diagram of the optical path control mechanism, whereas FIG. 4 is an A-A sectional view of FIG. 3. As illustrated in FIG. 3 and FIG. 4, the optical path control mechanism 12 has the oscillating part 12A including an optical member 20 on which the light L is made incident, and the actuators 12B oscillating the oscillating part 12A. In more detail, the optical path control mechanism 12 has the optical member 20, a movable part 22, a support part 24, shaft parts 25, coils 26, yokes 27, and magnets 28.

The optical member 20 is a member passing the light L made incident thereon. The optical member 20 makes the light L incident on one surface, passes the light L made incident thereon, and emits the light L from the other surface. The optical member 20 is a glass plate in the present embodiment; any material and shape may be employed.

The movable part 22 is a member supporting the optical member 20. The movable part 22 is fixed to the optical member 20. Specifically, the movable part 22 of the present embodiment is a plate-like member formed with a through hole at the center. The optical member 20 is fixed to the movable part 22 fit into the through hole of the movable part 22. The optical member 20 is fixed to the movable part 22 via a fixing member or adhesive to be fixed to the movable part 22; any method for fixing the optical member 20 to the movable part 22 may be employed.

The support part 24 is a member supporting the movable part 22 provided with the optical member 20 in an oscillatable manner. In the present embodiment, the support part 24 is a frame-like member and is provided so as to surround the outer perimeter of the movable part 22. The shaft parts 25 are members coupling the movable part 22 to the support part 24 in an oscillatable manner. In the present embodiment, two shaft parts 25 are provided. The shaft parts 25 are provided at respective positions near the apexes of the rectangular-shaped optical member 20 facing each other. The movable part 22 oscillates about an oscillation axis AX, which is an axis connecting the shaft parts 25 to each other. The movable part 22 oscillates about the oscillation axis AX, whereby the attitude of the optical member 20 provided in the movable part 22 changes, thus shifting the optical path of the light L passing through the optical member 20.

The coils 26 are mounted on the movable part 22 and are fixed to the movable part 22. The coils 26 are provided at the respective ends of the movable part 22. The yokes 27 are members forming a magnetic path. The yokes 27 are mounted on the support part 24 and are fixed to the support part 24. The yokes 27 are provided at the respective ends of the movable part 22 in correspondence with the coils 26. The magnets 28 are permanent magnets. The magnets 28 are mounted on the respective yokes 27 and are fixed to the respective yokes 27. The magnets 28 are placed at positions adjacent to the respective coils 26. The drive signal from the drive circuit 16 is input to the coils 26. In the example in FIG. 4, the magnet 28 is bonded to one side of the U-shaped yoke 27, forming an air gap between the face of the magnet 28 that is not bonded and the U-shaped opposing side of the yoke 27. The coil 26 is placed within this air gap. The drive signal is input to the coils 26. This causes a current to flow through the coils 26, which are conductors within magnetic fields caused by the magnets 28 to generate a force, and this force causes the movable part 22 (the oscillating part 12A) fixed to the coils 26 to oscillate. That is to say, it can be said that the actuator 12B according to the present embodiment is an electromagnetic actuator including the coil 26, the yoke 27, and the magnet 28.

In the present embodiment, the movable part 22 provided with the optical member 20 thus oscillates, and thus it can be said that the optical member 20, the movable part 22, and the coils 26 form the oscillating part 12A. That is to say, it can be said that the part of the optical path control mechanism 12 oscillating with respect to the support part 24 refers to the oscillating part 12A. When fixing members or adhesive for fixing the optical member 20 to the movable part 22 or a substrate or lead wires for passing a current through the coils 26 are provided, they also oscillate with respect to the support part 24 and are thus also included in the oscillating part 12A.

Although the actuator of the present embodiment is of what is called a moving coil type, in which the coils 26 are placed in the movable part 22, this is not limiting; for example, it may be what is called a moving magnet type, in which the magnets 28 are placed in the movable part 22, whereas the coils 26 are placed in the support part 24. In this case, the magnets 28 are oscillated together with the optical member 20, and thus the magnets 28 are included in the oscillating part 12A in place of the coils 26.

Although the optical path control mechanism 12 is configured as described above, this is not limiting; any configuration in which the optical part oscillates by the actuator to which the drive signal has been applied to enable the shift of the optical path of the light L by the optical part may be employed.

In the optical path control mechanism 12, the actuators 12B oscillate the oscillating part 12A in accordance with the drive signal. That is to say, the actuators 12B oscillate the oscillating part 12A in such a manner that the oscillating part 12A repeats an attitude change from a first angle D1 to a second angle D2 about the oscillation axis AX and an attitude change from the second angle D2 to the first angle D1 in accordance with the drive signal. The oscillating part 12A repeats the oscillation between the first angle D1 and the second angle D2, whereby the optical axis of the light L repeats a shift from a first position to a second position and a shift from the second position to the first position. In the present embodiment, an image projected onto the screen by the light L when the optical axis is in the first position and an image projected onto the screen by the light L when the optical axis is in the second position are shifted by half a pixel. That is to say, the image projected on the screen repeats shifts by half a pixel and returns by half a pixel. This increases an apparent number of pixels and enables images projected onto the screen to have a higher resolution. Thus, the optical axis shift amount in the present embodiment is equivalent to half a pixel of the image, and thus the first angle D1 and the second angle D2 are set to angles that can shift the image by half a pixel. The image shift amount is not limited to being equivalent to half a pixel but may be any amount such as ¼ or ⅛ of a pixel, for example. The first angle D1 and the second angles D2 may be set as appropriate in line with the image shift amount.

Drive Signal

The following describes the drive signal applied from the drive circuit 16 to the actuators 12B.

Figure 5:
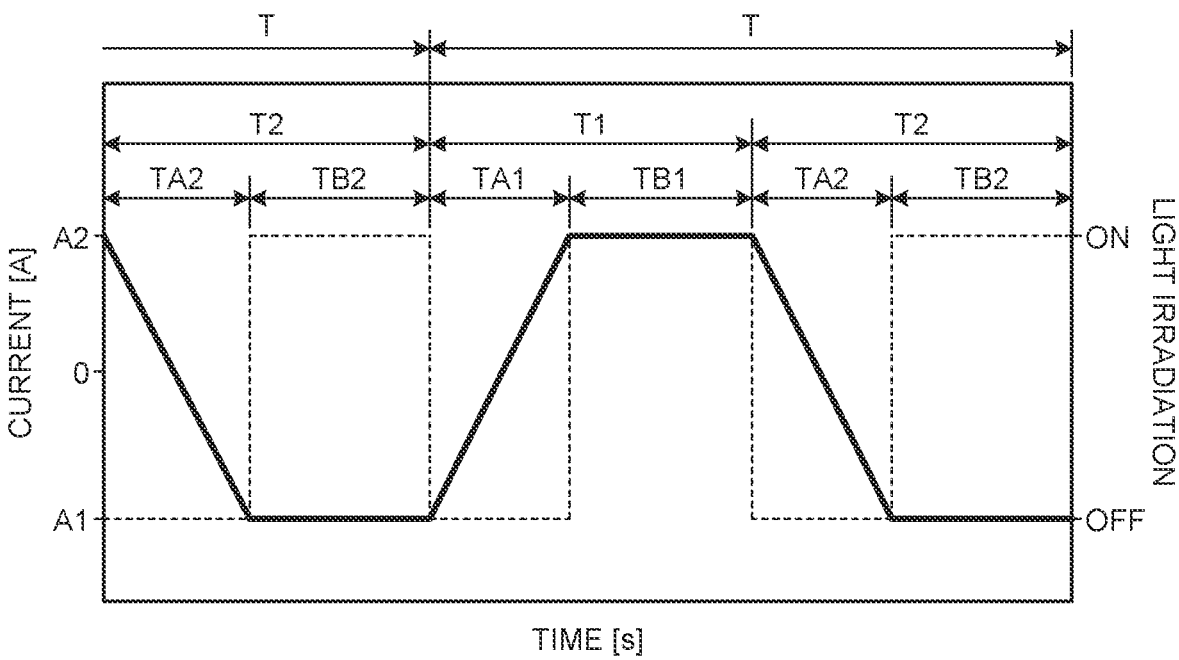
FIG. 5 is a graph illustrating a waveform of a drive signal according to the first embodiment.

FIG. 5 is a graph illustrating a waveform of the drive signal according to the first embodiment. The drive signal applied from the drive circuit 16 to the actuators 12B is an electric signal, and as illustrated in FIG. 5, the current value changes with the passage of time. In the following, the waveform representing a change in the current value with time of the drive signal is referred to as the waveform of the drive signal. In FIG. 5, the waveform of the drive signal is shown by a solid line. In the first embodiment, the drive signal has the same waveform repeated every cycle T. The cycle T includes a period T1 and a period T2, which is after the period T1 and is continuous with the period T1. The period T1 corresponds to a period in which the image when the optical axis of the light L is in the first position (in this case, the image not shifted by half a pixel) is displayed, whereas the period T2 corresponds to a period in which the image when the optical axis of the light L is in the second position (in this case, the image shifted by half a pixel) is displayed.

In a first period TA1 of the period T1, the drive signal changes the current value from a first current value A1 to a second current value A2. More specifically, in the first period TA1, the drive signal changes the current value linearly from the first current value A1 to the second current value A2 with the passage of time. That is to say, the drive signal has a current value of the first current value A1 at the start timing of the first period TA1, then changes the current value linearly from the first current value A1, and has a current value of the second current value A2 at the end timing of the first period TA1. The first current value A1 is a current value that can hold the oscillating part 12A at the first angle D1 and is set in accordance with the value of the first angle D1. The second current value A2 is a current value that can hold the oscillating part 12A at the second angle D2 and is set in accordance with the value of the second angle D2. The first current value A1 and the second current value A2 are current values opposite to each other in polarity, and their absolute values may be equal. FIG. 5 exemplifies that the first current value A1 is negative, whereas the second current value A2 is positive.

The length of the first period TA1 is a value corresponding to the natural frequency of the oscillating part 12A. As described above, the oscillating part 12A refers to the part of the optical path control mechanism 12 oscillating with respect to the support part 24 (the optical member 20, the movable part 22, and the coils 26 in the example of the present embodiment). That is to say, the length of the first period TA1 can be said to be a value corresponding to the natural frequency of the part oscillating with respect to the support part 24. More specifically, the length of the first period TA1 is preferably substantially the same value as the natural period of the oscillating part 12A and more preferably the same value as the natural period. The natural period is the inverse of the natural frequency. The term "substantially the same value" means that values that deviate from the natural period by about an error range are also acceptable. For example, when the deviation with respect to the natural period is within 5% of the value of the natural period, it may also be "substantially the same value." In the following, too, the description "substantially the same value" refers to the same meaning. The value of the natural vibration (the inverse of the natural frequency) is expressed as "1/f" [s] when the natural frequency is f [Hz].

The natural frequency of the oscillating part 12A may be measured in advance. For example, a sine wave may be applied (swept) to the actuators 12B with gradually increasing frequency from 0 Hz to measure the vibration of the oscillating part 12A, and the frequency at which the oscillating part 12A vibrates the most may be used as the natural frequency of the oscillating part 12A. A micro-displacement meter may be used to measure vibration. In the present embodiment, the length of the first period TA1 is set based on the natural frequency of the oscillating part 12A measured in this way, and the waveform of the drive signal is set in such a manner that the current value changes from the first current value A1 to the second current value A2 in the first period TA1 of the set length.

The drive signal holds the current value at the second current value A2 in a second period TB1 of the period T1. The second period TB1 is a period that is after the first period TA1 and is continuous with the first period TA1. Increasing the natural frequency of the oscillating part 12A is desirable, because doing so can shorten the first period TA1 and lengthen the second period TB1 (can lengthen it than the first period TA1, for example). Holding at the second current value A2 is not limited to the current value not changing strictly from the second current value A2 but may also include the current value shifting from the second current value A2 within the range of a certain value. The certain value here may be set to any value and may be a value 10% of the second current value A2, for example.

Thus, in the period T1, the drive signal gradually changes the current value from the first current value A1 to the second current value A2 and, when the current value reaches the second current value A2, holds the current value at the second current value A2.

In a third period TA2 of the period T2, the drive signal changes the current value from the second current value A2 to the first current value A1. The third period TA2 can be said to be a period that is after the second period TB1 and is continuous with the second period TB1. More specifically, in the third period TA2, the drive signal changes the current value linearly from the second current value A2 to the first current value A1 with the passage of time. That is to say, the drive signal has a current value of the second current value A2 at the start timing of the third period TA2, then changes the current value linearly from the second current value A2, and has a current value of the first current value A1 at the end timing of the third period TA2.

The length of the third period TA2 is the value corresponding to the natural frequency of the oscillating part 12A. More specifically, the length of the third period TA2 is preferably substantially the same value as the natural period (the inverse of the natural frequency) of the oscillating part 12A and more preferably the same value as the natural period. As to the third period TA2 in this embodiment, the length of the third period TA2 is equal to the length of the first period TA1.

In a fourth period TB2 of the period T2, the drive signal holds the current value at the first current value A1. The fourth period TB2 is a period that is after the third period TA2 and is continuous with the third period TA2. The fourth period TB2 is a period that is before the first period TA1 and is continuous with the first period TA1. The fourth period TB2 is equal to the second period TB1 in the present embodiment. Increasing the natural frequency of the oscillating part 12A is desirable, because doing so can shorten the third period TA2 and lengthen the fourth period TB2 (can lengthen it longer than the third period TA2, for example). Holding at the first current value A1 is not limited to the current value not changing strictly from the first current value A1 but may also include the current value shifting from the first current value A1 within the range of a certain value. The certain value here may be set to any value and may be a value 10% of the first current value A1, for example.

Thus, in the period T2, the drive signal gradually changes the current value from the second current value A2 to the first current value A1 and, when the current value reaches the first current value A1, holds the current value at the first current value A1.

As described above, in the first embodiment, the waveform of the drive signal is trapezoidal, and the first periods TA1 and TA2, in which the current value changes, are the value corresponding to the natural frequency of the oscillating part 12A.

The broken line in FIG. 5 shows periods during which the light L is applied. It is preferable that the irradiation apparatus 100 do not apply the light L in the first period TA1 and apply the light L in the second period TB1. It is preferable that the irradiation apparatus 100 do not apply the light L in the third period TA2 and apply the light L in the fourth period TB2.

Oscillation Pattern

Figure 6:
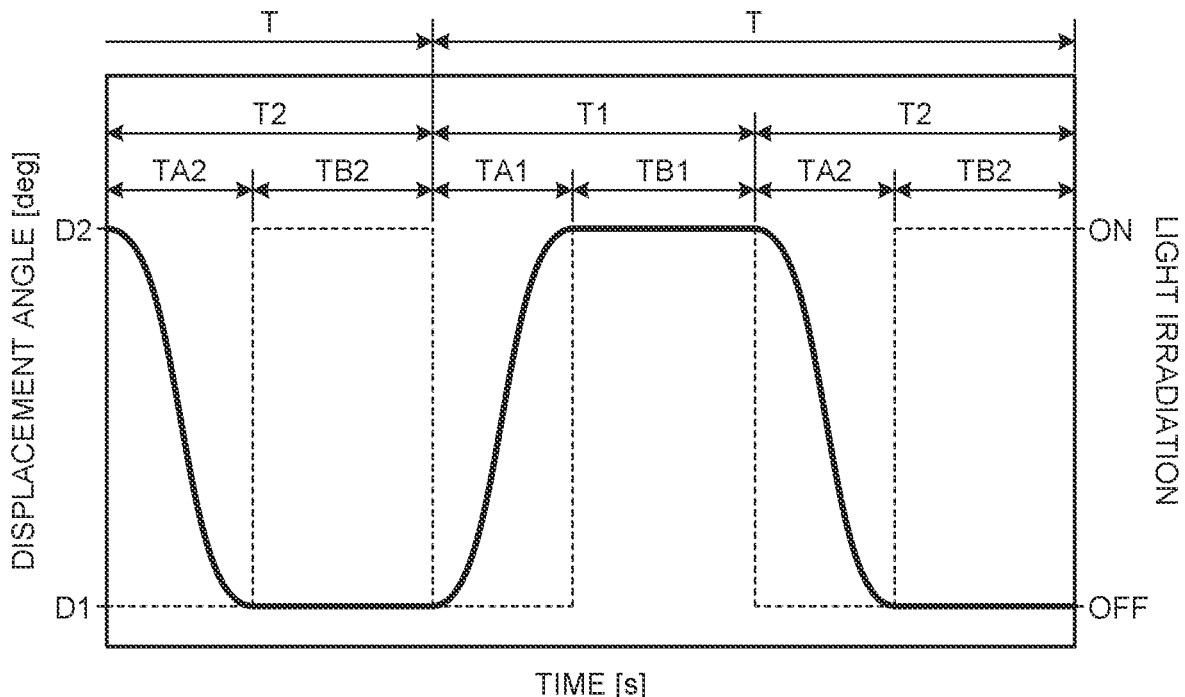
FIG. 6 is a graph illustrating an oscillation pattern of an optical part according to the first embodiment.

The following describes an oscillation pattern of the oscillating part 12A by the application of the drive signal. FIG. 6 is a graph illustrating an oscillation pattern of the optical part according to the first embodiment. The oscillation pattern of the oscillating part 12A refers to the displacement angle (an angle about the oscillation axis AX) of the oscillating part 12A with time when the drive signal is applied to the actuators 12B. In FIG. 6, the oscillation pattern is shown by a solid line.

In the first period TA1, the drive signal changes the current value from the first current value A1 to the second current value A2. Thus, the oscillating part 12A changes the displacement angle from the first angle D1 to the second angle D2 in the first period TA1.

In the second period TB1, the drive signal holds the current value at the second current value A2. Thus, the oscillating part 12A holds the displacement angle at the second angle D2 in the second period TB1. Holding at the second angle D2 is not limited to the displacement angle not changing strictly from the second angle D2 but may also include the displacement angle shifting from the second angle D2 within the range of a certain value. The certain value here may be set to any value and may be a value 10% of the second angle D2, for example.

In the third period TA2, the drive signal changes the current value from the second current value A2 to the first current value A1. Thus, the oscillating part 12A changes the displacement angle from the second angle D2 to the first angle D1 in the third period TA2.

In the fourth period TB2, the drive signal holds the current value at the first current value A1. Thus, the oscillating part 12A holds the displacement angle at the first angle D1 in the fourth period TB2. Holding at the first angle D1 is not limited to the displacement angle not changing strictly from the first angle D1 but may also include the displacement angle shifting from the first angle D1 within the range of a certain value. The certain value here may be set to any value and may be a value 10% of the first angle D1, for example.

The light L is applied in the second periods TB1 and TB2. Thus, in the second period TB1, the light L is applied to the oscillating part 12A held at the second angle D2, making the light path of the light L the first position. In the fourth period TB2, the light L is applied to the oscillating part 12A held at the first angle D1, shifting the light path of the light L to the second position, and shifting the image by half a pixel.

In optical path control apparatuses shifting the optical path by oscillating the optical part, the optical part is required to be stably oscillated. After diligent research, the inventor of the present invention has discovered that by setting the lengths of the first periods TA1 and TA2 to the value corresponding to the natural frequency of the oscillating part 12A, the oscillating part 12A is suppressed from vibrating in the second periods TB1 and TB2, and the oscillating part 12A can be oscillated stably. That is to say, in the present embodiment, the lengths of the first periods TA1 and TA2 are the value corresponding to the natural frequency of the oscillating part 12A, and thus the vibration of the oscillating part 12A in the second periods TB1 and TB2 is suppressed, and the oscillating part 12A can be oscillated stably. Thus, according to the present embodiment, the oscillating part 12A is oscillated at high speed and is stopped stably, and thus image degradation can be suppressed.

Effects

As described above, the optical path control apparatus 10 according to the present embodiment has the oscillating part 12A including the optical member 20 on which the light L is made incident, the actuators 12B oscillating the oscillating part 12A, and the drive circuit 16 (the drive unit) applying the drive signal to the actuators 12B to cause the actuators 12B to oscillate the oscillating part 12A and to control the optical path. The drive circuit 16 applies the drive signal with a waveform including the first period TA1, in which the current value is changed from the first current value A1 to the second current value A2, and the second period TB1, which is continuous with the first period TA1 and in which the current value is held at the second current value A2, to the actuators 12B. The drive circuit 16 applies the drive signal in such a manner that the length of the first period TA1 is the value corresponding to the natural frequency of the oscillating part 12A.

Thus, in the first embodiment, by setting the length of the first period TA1 to the value corresponding to the natural frequency of the oscillating part 12A, the oscillating part 12A is suppressed from vibrating in the second period TB1, and the oscillating part 12A can be oscillated stably. Owing to the waveform changing the current value in the first period TA1, the length of which corresponds to the natural frequency of the oscillating part 12A, and holding the current value in the subsequent second period TB1, the waveform capable of stably oscillating the oscillating part 12A can be easily set without making waveform setting complicated.

The drive circuit 16 applies the drive signal in such a manner that the length of the first period TA1 is the inverse of the natural frequency of the oscillating part 12A. By making the length of the first period TA1 the inverse of the natural frequency of the oscillating part 12A, the oscillating part 12A can be oscillated more stably.

The drive circuit 16 applies the drive signal in such a manner that the current value varies linearly changes from the first current value A1 to the second current value A2 in the first period TA1. By making the change in the current value in the first period TA1 linear, the oscillating part 12A can be oscillated more stably.

The display apparatus 1 according to the present embodiment includes the optical path control apparatus 10 and the irradiation apparatus 100 applying the light L to the oscillating part 12A. The display apparatus 1 according to the present embodiment includes the optical path control apparatus 10 and can thereby stably oscillate the oscillating part 12A and suppress image degradation.

The irradiation apparatus 100 applies the light L to the oscillating part 12A in the second period TB1. By applying the light L in the second period TB1, the light path can be shifted appropriately.

The method of optical path control according to the present embodiment applies the drive signal to the actuators 12B oscillating the oscillating part 12A on which the light L is made incident to control the optical path. The present method has a step of applying the drive signal with a waveform including the first period TA1, in which the current value is changed from the first current value A1 to the second current value A2, and the second period TB1, which is continuous with the first period TA1 and in which the current value is held at the second current value A2, to the actuators 12B to cause the actuators 12B to oscillate the oscillating part 12A. In the present method, the length of the first period TA1 is the value corresponding to the natural frequency of the oscillating part 12A. The present method can stably oscillate the oscillating part 12A.

Second Embodiment

The following describes a second embodiment. The second embodiment differs from the first embodiment in the waveform of the drive signal. In the second embodiment, for the parts common to those of the first embodiment in configuration, descriptions thereof are omitted.

Figure 7:
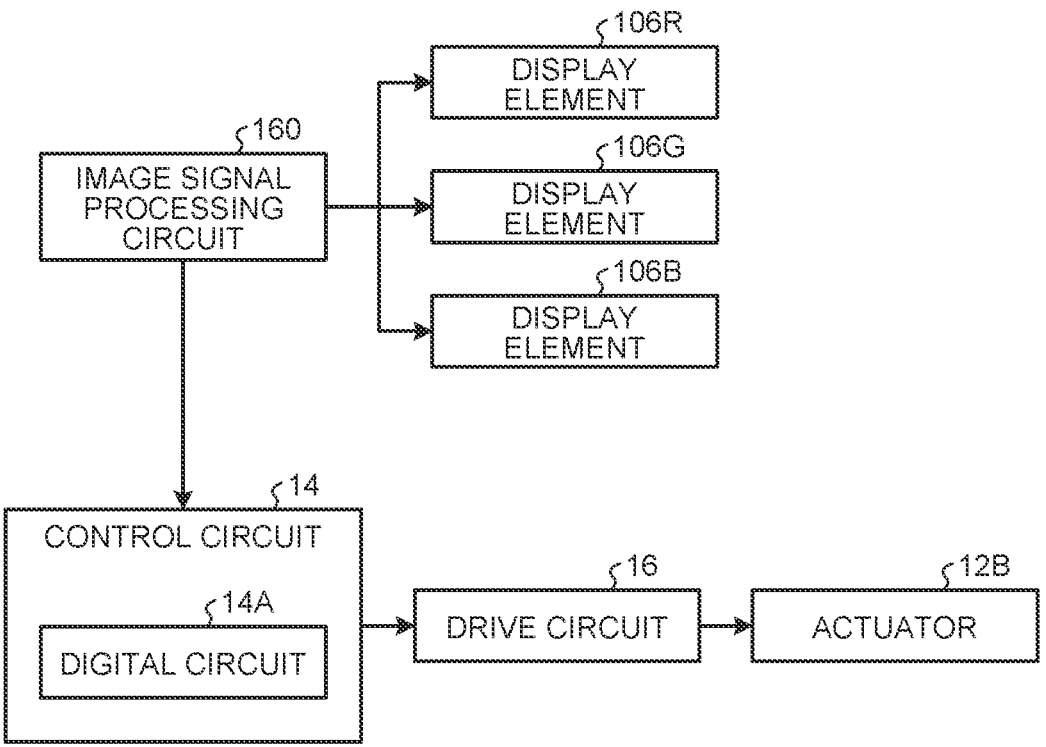
FIG. 7 is a block diagram schematically illustrating a circuit configuration of the display apparatus in a second embodiment.

FIG. 7 is a block diagram schematically illustrating a circuit configuration of the display apparatus in the second embodiment. As illustrated in FIG. 7, the control circuit 14 according to the second embodiment includes a digital circuit 14A and does not have a DA converter (the converter 14B) as in the first embodiment. In the second embodiment, a digital drive signal generated by the digital circuit 14A is input to the drive circuit 16, and the drive circuit 16 amplifies the digital drive signal and outputs it to the actuators 12B. The actuators 12B are driven in response to the drive signal to oscillate the oscillating part 12A. Although the digital drive signal is thus input to the drive circuit 16 in the second embodiment, this is not limiting; the drive signal analog-converted by the converter 14B may be input as in the first embodiment.

Drive Waveform

Figure 8:
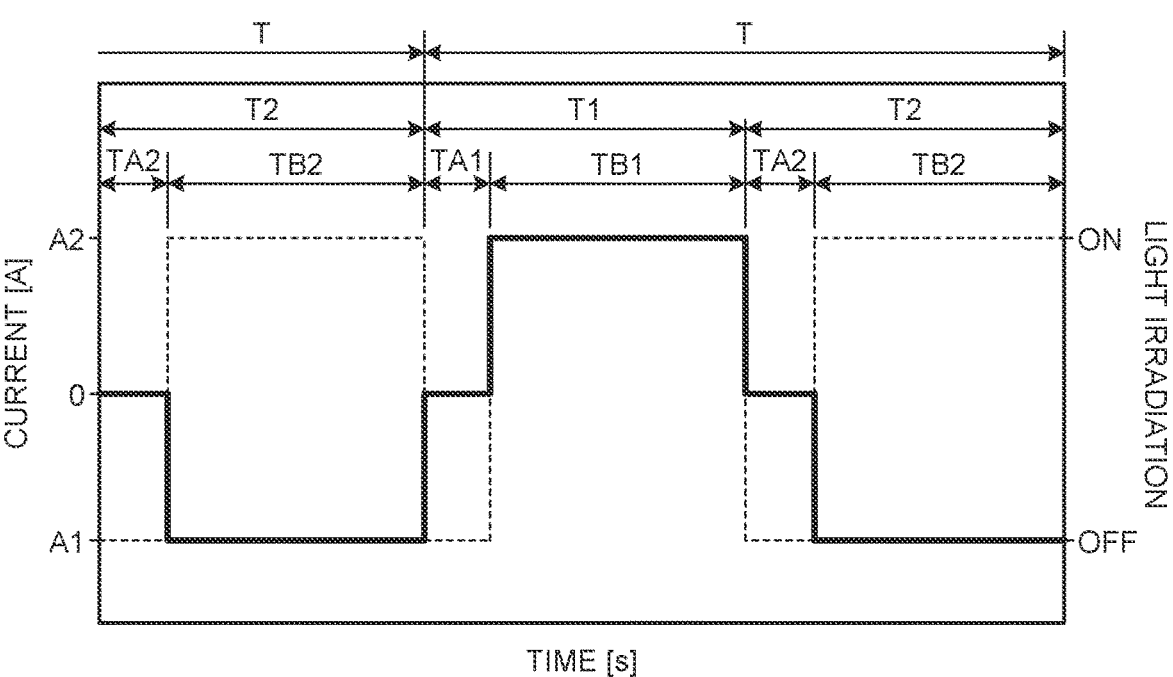
FIG. 8 is a graph illustrating the waveform of the drive signal according to the second embodiment.

FIG. 8 is a graph illustrating the waveform of the drive signal according to the second embodiment. As illustrated in FIG. 8, in the second embodiment, the current value is held at zero in the first period TA1. In the present embodiment, the digital circuit 14A or the like includes a digital switching circuit, and thus the current supply to the actuators 12B can be stopped, and the period during which the current supply is stopped is a period during which the current value is set to zero.

The length of the first period TA1 is the value corresponding to the natural frequency of the oscillating part 12A. More specifically, the length of the first period TA1 is preferably substantially the same value as the half value of the natural period (the inverse of the natural frequency) of the oscillating part 12A and more preferably the same value as the half value of the natural period (the inverse of the natural frequency). The half value of the natural period is expressed as "$1/(2 \cdot f)$" [s] when the natural frequency is f [Hz].

The drive signal holds the current value at the second current value A2 in the second period TB1. The second period TB1 is a period that is after the first period TA1 and is continuous with the first period TA1. That is to say, at the start timing of the second period TB1 (the timing of switching from the first period TA1 to the second period TB1), the current value switches from zero to the second current value A2, and the current value is held at the second current value A2 until the end timing of the second period TB1.

Thus, in the second embodiment, the drive signal in the period T1 holds the current value at zero in the first period TA1, switches the current value to the second current value A2 at the start timing of the second period TB1, and holds the current value at the second current value A2 in the second period TB1.

In the second embodiment, the current value is held at zero in the third period TA2. The third period TA2 can be said to be a period that is after the second period TB1 and is continuous with the second period TB1. That is to say, at the start timing of the third period TA2 (the timing of switching from the second period TB1 to the third period TA2), the current value switches from the second current value A2 to zero, and the current value is held at zero until the end timing of the third period TA2.

The length of the third period TA2 is the value corresponding to the natural frequency of the oscillating part 12A. More specifically, the length of the third period TA2 is preferably substantially the same value as the half value of the natural period (the inverse of the natural frequency) of the oscillating part 12A and more preferably the same value as the half value of the natural period (the inverse of the natural frequency). In the present embodiment, the length of the third period TA2 is equal to the length of the first period TA1.

The drive signal holds the current value at the first current value A1 in the fourth period TB2. The fourth period TB2 is a period that is after the third period TA2 and is continuous with the third period TA2. That is to say, at the start timing of the fourth period TB2 (the timing of switching from the third period TA2 to the fourth period TB2), the current value switches from zero to the first current value A1, and the current value is held at the first current value A1 until the end timing of the fourth period TB2.

Thus, in the second embodiment, the drive signal in the period T2 holds the current value at zero in the third period TA2, switches the current value to the first current value A1 at the start timing of the fourth period TB2, and holds the current value at the first current value A1 in the fourth period TB2.

In the first period TA1 following the fourth period TB2, the current value is held at zero as described above. That is to say, at the start timing of the first period TA1 (the timing of switching from the fourth period TB2 to the first period TA1), the current value switches from the first current value A1 to zero, and the current value is held at zero until the end timing of the first period TA1.

The broken line in FIG. 8 shows periods during which the light L is applied. It is preferable that the irradiation apparatus 100 do not apply the light L in the first period TA1 and apply the light L in the second period TB1. It is preferable that the irradiation apparatus 100 do not apply the light L in the third period TA2 and apply the light L in the fourth period TB2.

Oscillation Pattern

Figure 9:
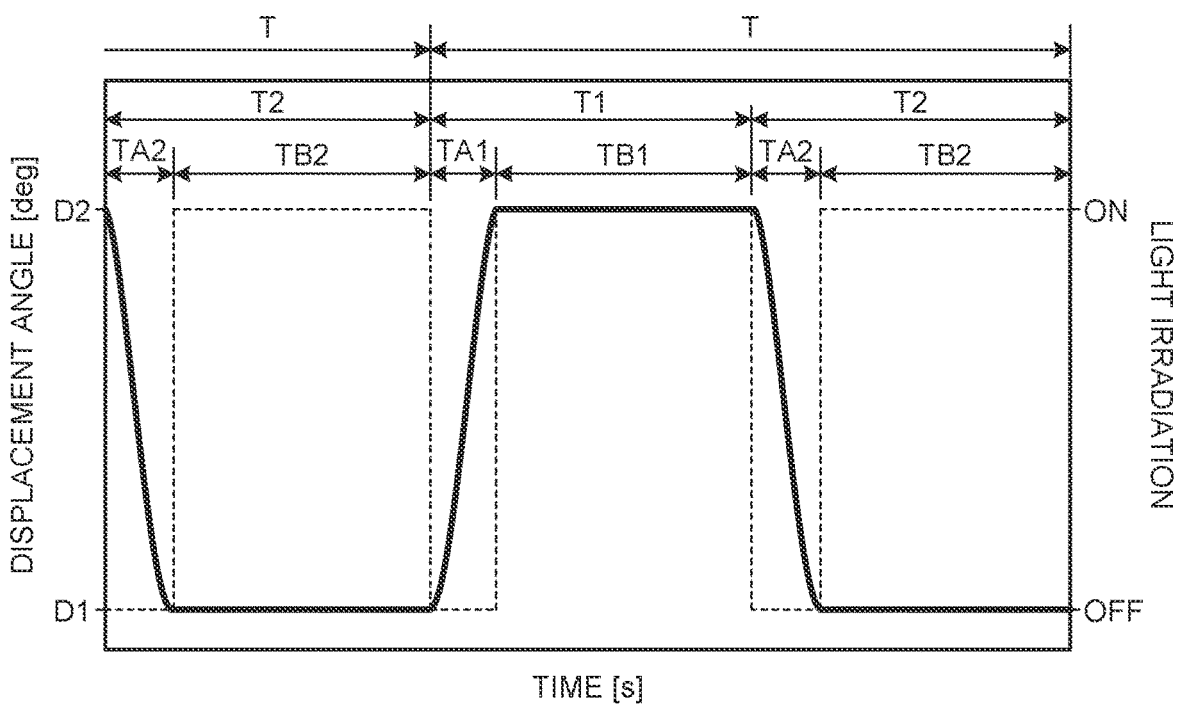
FIG. 9 is a graph illustrating the oscillation pattern of the optical part according to the second embodiment.

The following describes an oscillation pattern of the oscillating part 12A by the application of the drive signal. FIG. 9 is a graph illustrating the oscillation pattern of the optical part according to the second embodiment.

The drive signal switches the current value from the first current value A1 to zero at the start timing of the first period TA1 and holds the current value at zero until the end timing of the first period TA1. Thus, the oscillating part 12A changes the displacement angle from the first angle D1 to the second angle D2 in the first period TA1. More specifically, the oscillating part 12A, which has been twisted to the first angle D1 and held at the first current value A1, is released from the twisting and returns to a neutral position owing to the current becoming zero and is twisted to the opposite second angle D2 to reach the second angle D2 owing to an inertial force further acting thereon.

The drive signal switches the current value from zero to the second current value A2 at the start timing of the second period TB1 and holds the current value at the second current value A2 until the end timing of the second period TB1. Thus, the oscillating part 12A holds the displacement angle at the second angle D2 in the second period TB1. That is to say, the oscillating part 12A, which has been twisted to the second angle D2, is held at the second angle D2 owing to a balance between a force to return to the neutral position and a force caused by the second current value A2.

The drive signal switches the current value from the second current value A2 to zero at the start timing of the third period TA2 and holds the current value at zero until the end timing of the third period TA2. Thus, the oscillating part 12A changes the displacement angle from the second angle D2 to the first angle D1 in the third period TA2.

The drive signal switches the current value from zero to the first current value A1 at the start timing of the fourth period TB2 and holds the current value at the first current value A1 until the end timing of the fourth period TB2. Thus, the oscillating part 12A holds the displacement angle at the first angle D1 in the fourth period TB2.

In the second embodiment, the lengths of the first periods TA1 and TA2, in which the current value is switched to zero and held at zero, are the value corresponding to the natural frequency of the oscillating part 12A, and thus the vibration of the oscillating part 12A in the second periods TB1 and TB2 is suppressed, and the oscillating part 12A can be oscillated stably. Thus, according to the present embodiment, image degradation can be suppressed. More specifically, by setting the current value to zero in the first periods TA1 and TA2, the lengths of the first periods TA1 and TA2 can be shortened and the lengths of the second periods TB1 and TB2 can be lengthened compared with gradually switching the current value as in the first embodiment, for example. This lengthens the period during which the light L is applied and can thus suppress image degradation more suitably.

Effects

As described above, the optical path control apparatus 10 according to the second embodiment has the oscillating part 12A on which the light L is made incident, the actuators 12B oscillating the oscillating part 12A, and the drive circuit 16 (the drive unit) applying the drive signal to the actuators 12B to cause the actuators 12B to oscillate the oscillating part 12A and to control the optical path. The drive circuit 16 applies the drive signal with a waveform including the first period TA1, in which the current value is set to zero, and the second period TB1, which is after the first period TA1 and is continuous with the first period TA1 and in which the current value is held at the second current value A2, to the actuators 12B. The drive circuit 16 applies the drive signal in such a manner that the length of the first period TA1 is the value corresponding to the natural frequency of the oscillating part 12A.

Thus, in the second embodiment, by setting the length of the first period TA1 to the value corresponding to the natural frequency of the oscillating part 12A, the oscillating part 12A is suppressed from vibrating in the second period TB1, and the oscillating part 12A can be oscillated stably. Owing to the waveform setting the current value to zero in the first period TA1, the length of which corresponds to the natural frequency of the oscillating part 12A, and switching the current value to the second current value A2 and holding it in the subsequent second period TB1, the waveform capable of stably oscillating the oscillating part 12A can be easily set without making waveform setting complicated.

The drive circuit 16 applies the drive signal in such a manner that the length of the first period TA1 is substantially the same value as the half value of the natural period (the inverse of the natural frequency) of the oscillating part 12A. By making the length of the first period TA1 the inverse of the natural frequency of the oscillating part 12A, the oscillating part 12A can be oscillated more stably.

The drive circuit 16 applies the drive signal in such a manner that in the fourth period TB2 (the third period), which is before the first period TA1 and is continuous with the first period TA1, the current value is held at the first current value A1, which is opposite to the second current value A2 in polarity. Thus, by applying the current values opposite to each other in polarity before and after the first period TA1, the oscillating part 12A can be oscillated stably and appropriately.

Third Embodiment

The following describes a third embodiment. The third embodiment differs from the first embodiment in the waveform of the drive signal. In the third embodiment, for the parts common to those of the first embodiment in configuration, descriptions thereof are omitted.

The control circuit 14 according to the third embodiment, like the second embodiment, also includes the digital circuit 14A and does not necessarily have a DA converter (the converter 14B) as in the first embodiment. That is to say, in the third embodiment, the digital drive signal generated by the digital circuit 14A is input to the drive circuit 16, and the drive circuit 16 switches the polarity of the current of the drive signal by a switching circuit, not illustrated, that is, switches the current so as to be opposite in direction and the same in the current value, and outputs the current to the actuators 12B. Although the digital drive signal is thus input to the drive circuit 16 in the third embodiment, this is not limiting; the drive signal analog-converted by the converter 14B may be input as in the first embodiment.

Drive Waveform

Figure 10:
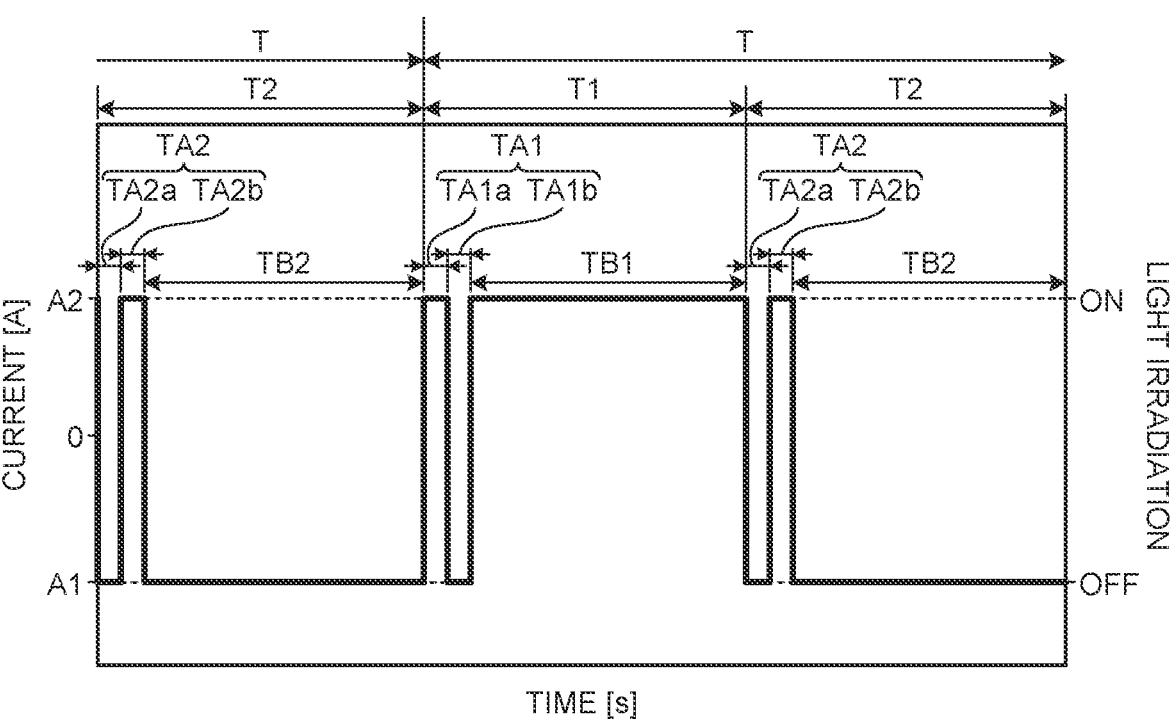
FIG. 10 is a graph illustrating the waveform of the drive signal according to a third embodiment.

FIG. 10 is a graph illustrating the waveform of the drive signal according to the third embodiment. As illustrated in FIG. 10, in the third embodiment, in the first period TA1, the current value is held at the second current value A2, and then the current value is held at the first current value A1. That is to say, in a period TA1a of the first period TA1, the current value is held at the second current value A2, whereas in a period TA1b of the first period TA1, the current value is held at the first current value A1. The period TA1b is a period that is after the period TA1a and is continuous with the period TA1a. That is to say, at the start timing of the period TA1b (the timing of switching from the period TA1a to the period TA1b), the current value switches from the second current value A2 to the first current value A1, and the current value is held at the first current value A1 until the end timing of the period TA1b.

The length of the first period TA1 is the value corresponding to the natural frequency of the oscillating part 12A. The length of the first period TA1 is preferably substantially the same value as the one-third value of the natural period (the inverse of the natural frequency) of the oscillating part 12A and more preferably the same value as the one-third value of the natural period. The one-third value of the natural period (the inverse of the natural frequency) is expressed as "1/(3·f)" [s] when the natural frequency is f [Hz].

More specifically, the length of the period TA1a and the length of the period TA1b of the first period TA1 are the value corresponding to the natural frequency of the oscillating part 12A. The length of the period TA1a and the length of the period TA1b are preferably the same. More specifically, the length of the period TA1a and the length of the period TA1b are preferably substantially the same value as the one-sixth value of the natural period (the inverse of the natural frequency) of the oscillating part 12A and more preferably the same value as the one-sixth value of the natural period. The one-sixth value of the inverse of the natural frequency is expressed as "1/(6·f)" [s] when the natural frequency is f [Hz].

The drive signal holds the current value at the second current value A2 in the second period TB1. The second period TB1 is a period that is after the first period TA1 (the period TA1b) and is continuous with the first period TA1 (the period TA1b). That is to say, at the start timing of the second period TB1 (the timing of switching from the period TA1b to the second period TB1), the current value switches from the first current value A1 to the second current value A2, and the current value is held at the second current value A2 until the end timing of the second period TB1.

Thus, in the third embodiment, the drive signal in the period T1 holds the current value at the second current value A2 in the period TA1a, holds the current value at the switched first current value A1 in the period TA1b, and holds the current value at the switched second current value A2 in the second period TB1.

In the third embodiment, in the third period TA2, the current value is held at the first current value A1, and then the current value is held at the second current value A2. That is to say, at the start timing of the period TA2a of the third period TA2 (the timing of switching from the second period TB1 to the period TA2a), the current value switches from the second current value A2 to the first current value A1 and is held at the first current value A1 until the end timing of the period TA2a. The period TA2b is a period that is after the period TA2a and is continuous with the period TA2a. That is to say, at the start timing of the period TA2b (the timing of switching from the period TA2a to the period TA2b), the current value switches from the first current value A1 to the second current value A2, and the current value is held at the second current value A2 until the end timing of the period TA2b.

The length of the third period TA2 is the value corresponding to the natural frequency of the oscillating part 12A. The length of the third period TA2 is preferably substantially the same value as the one-third value of the natural period (the inverse of the natural frequency) of the oscillating part 12A and more preferably the same value as the one-third value of the natural period. In the present embodiment, the length of the third period TA2 is equal to the length of the first period TA1.

More specifically, the length of the period TA2a and the length of the period TA2b of the third period TA2 are the value corresponding to the natural frequency of the oscillating part 12A. The length of the period TA2a and the length of the period TA2b are preferably the same. More specifically, the length of the period TA2a and the length of the period TA2b are preferably substantially the same value as the one-sixth value of the inverse of the natural frequency of the oscillating part 12A and more preferably the same value as the one-sixth value of the natural period. In the present embodiment, the length of the period TA2a is equal to the length of the period TA1a, whereas the length of the period TA2b is equal to the length of the period TA1b.

The drive signal holds the current value at the first current value A1 in the fourth period TB2. The fourth period TB2 is a period that is after the third period TA2 (the period TA2b) and is continuous with the third period TA2 (the period TA2b). That is to say, at the start timing of the fourth period TB2 (the timing of switching from the period TA2b to the fourth period TB2), the current value switches from the second current value A2 to the first current value A1, and the current value is held at the first current value A1 until the end timing of the fourth period TB2.

Thus, in the third embodiment, the drive signal in the period T2 holds the current value at the first current value A1 in the period TA2a, holds the current value at the switched second current value A2 in the period TA2b, and holds the current value at the switched first current value A1 in the fourth period TB2.

In the period TA1a following the fourth period TB2, the current value is held at the second current value A2 as described above. That is to say, at the start timing of the period TA1a (the timing of switching from the fourth period TB2 to the period TA1a), the current value switches from the first current value A1 to the second current value A2, and the current value is held at the second current value A2 until the end timing of the period TA1a.

The broken line in FIG. 10 shows periods during which the light L is applied. It is preferable that the irradiation apparatus 100 do not apply the light L in the first period TA1 and apply the light L in the second period TB1. It is preferable that the irradiation apparatus 100 do not apply the light L in the third period TA2 and apply the light L in the fourth period TB2.

Oscillation Pattern

Figure 11:
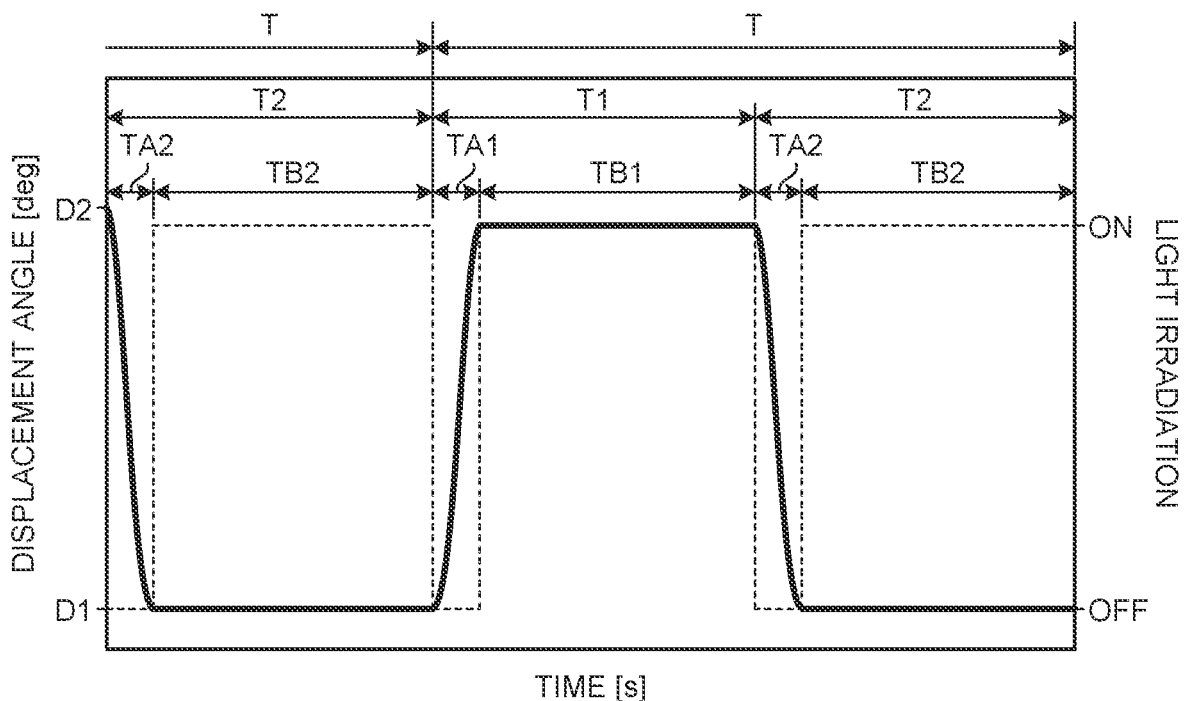
FIG. 11 is a graph illustrating the oscillation pattern of the optical part according to the third embodiment.

The following describes an oscillation pattern of the oscillating part 12A by the application of the drive signal. FIG. 11 is a graph illustrating the oscillation pattern of the optical part according to the third embodiment.

The drive signal switches the current value from the first current value A1 to the second current value A2 at the start timing of the period TA1a, holds the current value at the second current value A2 until the end timing of the period TA1a, switches the current value from the second current value A2 to the first current value A1 at the start timing of the period TA1b, and holds the current value at the first current value A1 until the end timing of the period TA1b. Thus, the oscillating part 12A changes the displacement angle from the first angle D1 to the second angle D2 in the first period TA1 (the periods TA1a and TA1b). More specifically, in addition to a force to twist back at the first angle D1, a force is further applied in a returning direction by the second current value A2 to accelerate the oscillating part 12A in a direction of the second angle D2. If being left as it is, the oscillating part 12A will be further twisted beyond the second angle D2 due to inertia, and thus in the present embodiment, the first current value A1 is passed after that to apply braking. Thus, the oscillating part 12A can be oscillated even faster than in the second embodiment.

The drive signal switches the current value from the first current value A1 to the second current value A2 at the start timing of the second period TB1 and holds the current value at the second current value A2 until the end timing of the second period TB1. Thus, the oscillating part 12A holds the displacement angle at the second angle D2 in the second period TB1.

The drive signal switches the current value from the second current value A2 to the first current value A1 at the start timing of the period TA2a, holds the current value at the first current value A1 until the end timing of the period TA2a, switches the current value from the first current value A1 to the second current value A2 at the start timing of the period TA2b, and holds the current value at the second current value A2 until the end timing of the period TA2b. Thus, the oscillating part 12A changes the displacement angle from the second angle D2 to the first angle D1 in the third period TA2 (the periods TA2a and TA2b).

The drive signal switches the current value from the second current value A2 to the first current value A1 at the start timing of the fourth period TB2 and holds the current value at the first current value A1 until the end timing of the fourth period TB2. Thus, the oscillating part 12A holds the displacement angle at the first angle D1 in the fourth period TB2.

In the third embodiment, the lengths of the first periods TA1 and TA2, in which the polarity of the current value is switched, are the value corresponding to the natural frequency of the oscillating part 12A, and thus the vibration of the oscillating part 12A in the second periods TB1 and TB2 is suppressed, and the oscillating part 12A can be oscillated stably. Thus, according to the present embodiment, image degradation can be suppressed. More specifically, by switching the polarity of the current value in the first periods TA1 and TA2, the lengths of the first periods TA1 and TA2 can be shortened and the lengths of the second periods TB1 and TB2 can be lengthened compared with the first embodiment and the second embodiment, for example. This lengthens the period during which the light L is applied and can thus suppress image degradation more suitably.

Effects

As described above, the optical path control apparatus 10 according to the third embodiment has the oscillating part 12A on which the light L is made incident, the actuators 12B oscillating the oscillating part 12A, and the drive circuit 16 (the drive unit) applying the drive signal to the actuators 12B to cause the actuators 12B to oscillate the oscillating part 12A and to control the optical path. The drive circuit 16 applies the drive signal with a waveform including the first period TA1, in which the current value is held at the second current value A2, and then the current value is held at the first current value A1, which is opposite to the second current value A2 in polarity, and the second period TB1, which is continuous with the first period TA1 and in which the current value is held at the second current value A2, to the actuators 12B. The drive circuit 16 applies the drive signal in such a manner that the length of the first period TA1 is the value corresponding to the natural frequency of the oscillating part 12A.

Thus, in the third embodiment, by setting the length of the first period TA1 to the value corresponding to the natural frequency of the oscillating part 12A, the oscillating part 12A is suppressed from vibrating in the second period TB1, and the oscillating part 12A can be oscillated stably. Owing to the waveform switching the polarity of the current value in the first period TA1, the length of which corresponds to the natural frequency of the oscillating part 12A, and switching the current value to the second current value A2 and holding it in the subsequent second period TB1, the waveform capable of stably oscillating the oscillating part 12A can be easily set without making waveform setting complicated.

The drive circuit 16 applies the drive signal in such a manner that the length of the period TA1a, in which the current value is held at the second current value A2 in the first period TA1, and the length of the period TA1b, in which the current value is held at the first current value A1 in the first period TA1, are the same. By making the lengths of the periods TA1a and TA1b equal, the oscillating part 12A can be oscillated more stably.

The drive circuit 16 applies the drive signal in such a manner that the length of the period TA1a, in which the current value is held at the second current value A2 in the first period TA1, and the length of the period TA1b, in which the current value is held at the first current value A1 in the first period TA1, are substantially the same value as the one-sixth value of the inverse of the natural frequency of the oscillating part 12A. By setting the length of the first period TA1 to this range, the oscillating part 12A can be oscillated more stably.

According to the above-described embodiments, it is possible that the optical part is oscillated at high speed and is stopped stably.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical path control apparatus comprising:
an oscillating part having an optical member on which light is made incident;
an actuator configured to oscillate the oscillating part; and
a drive unit configured to apply to the actuator a drive signal with a waveform to cause the actuator to oscillate the oscillating part and to control an optical path, the waveform including a first period in which a current value is changed from a first current value to a second current value, including a second period that is continuous with the first period and in which the current value is held at the second current value, and including a third period in which the current value is changed from the second current value to the first current value, the drive unit applying the drive signal so that a length of each of the first period and the third period is a value corresponding to a natural frequency of the oscillating part, wherein
the first current value is utilized for holding the oscillating part at a first angle,
the second current value is utilized for holding the oscillating part at a second angle,
the first current value and the second current value are opposite to each other in polarity, and
the length of the first period is equal to the length of the third period.

2. The optical path control apparatus according to claim 1, wherein the drive unit applies the drive signal so that the length of the first period is substantially a same value as an inverse of the natural frequency of the oscillating part.

3. The optical path control apparatus according to claim 1, wherein the drive unit applies the drive signal so that the current value linearly changes from the first current value to the second current value in the first period.

4. A display apparatus comprising:
the optical path control apparatus according to claim 1; and
an irradiation apparatus applying light to the optical member.

5. The display apparatus according to claim 4, wherein the irradiation apparatus applies the light to the optical member in the second period.

6. A method of controlling an optical path by applying a drive signal to an actuator configured to oscillate an oscillating part including an optical member on which light is made incident, the method comprising:

applying to the actuator the drive signal with a waveform to cause the actuator to oscillate the oscillating part and to control an optical path, the waveform including a first period in which a current value is changed from a first current value to a second current value, including a second period that is continuous with the first period and in which the current value is held at the second current value, and including a third period in which the current value is changed from the second current value to the first current value, wherein a length of each of the first period and the third period is set to a value corresponding to a natural frequency of the oscillating part, and wherein the first current value is utilized for holding the oscillating part at a first angle, the second current value is utilized for holding the oscillating part at a second angle, the first current value and the second current value are opposite to each other in polarity, and the length of the first period is equal to the length of the third period.

\* \* \* \* \*